United States Patent
Sasaki et al.

[11] Patent Number: 5,165,905
[45] Date of Patent: Nov. 24, 1992

[54] PROCESS FOR PRODUCTION OF A HIGHLY PURE SILICIC ACID AQUEOUS SOLUTION

[75] Inventors: Shigeo Sasaki; Miho Yamada, both of Yokkaichi, Japan

[73] Assignee: Monsanto Japan Ltd., Tokyo, Japan

[21] Appl. No.: 620,054

[22] Filed: Nov. 30, 1990

[30] Foreign Application Priority Data

Nov. 30, 1989 [JP] Japan .................. 1-309036

[51] Int. Cl.$^5$ .................. C01B 33/143; B01D 13/02
[52] U.S. Cl. .................. 423/325; 204/101; 204/182.2; 204/182.4; 423/332; 423/335
[58] Field of Search .............. 423/325, 324, 332, 335; 204/101, 182.2, 182.4

[56] References Cited

U.S. PATENT DOCUMENTS

| | | | |
|---|---|---|---|
| 3,649,556 | 3/1972 | Hoffman | 423/324 |
| 3,668,088 | 6/1972 | Iler | 204/101 |
| 4,124,471 | 11/1978 | Lieb et al. | 204/180 P |
| 4,147,605 | 4/1979 | Schenker et al. | 204/180 P |
| 4,387,008 | 6/1983 | Winyall et al. | 204/101 |

FOREIGN PATENT DOCUMENTS

61-036114 2/1986 Japan .
63-021212 1/1988 Japan .
01126216 5/1989 Japan .

*Primary Examiner*—Olik Chaudhuri
*Assistant Examiner*—Ken Horton
*Attorney, Agent, or Firm*—Sherman and Shalloway

[57] ABSTRACT

A process for producing high purity silicic acid aqueous solution is disclosed, wherein alkali metals in an alkali silicate solution are removed by ion-exchanging, the resulting solution is treated in an electrochemical process in the present of a strong acid and oxidizing agent to solubilize the remaining non-alkali metal salts, and the non-alkali metals in the water soluble salts are removed by ion-exchanging to obtain the silicic acid aqueous solution.

5 Claims, 1 Drawing Sheet

PROCESS FOR PRODUCTION OF A HIGHLY PURE SILICIC ACID AQUEOUS SOLUTION

BACKGROUND OF THE INVENTION

1. Field of the Invention

The present invention relates to a process for production of a highly purity silicic acid aqueous solution from a low pure alkali silicate aqueous solution. More particularly, it relates to a process for producing a highly pure silicic acid aqueous solution. Considering the fact that low purity alkali silicates have been thought to be unsuitable as starting materials for silica sources of an artificial quartz or an optical fiber, it is surprising that the present invention can use a low purity silicate for such purposes.

2. Description of the Prior Art

Silica sources for an artificial quartz or an optical fiber have been produced by pyrolysis of purified silicon tetrachloride or by hydrolysis of purified tetraethyl silicate. Though the silicon tetrachloride and tetraethyl silicate have high purities, they are very expensive and difficult to handle because of their corrosiveness and flammability.

A Japanese Patent Laid Open No. Sho. 63-21212 discloses a process for producing silica comprising, ion exchanging an alkali silicate aqueous solution with cation-exchange resin to get an acidic silica sol, adding an acid to the sol, ion exchanging the sol with cation-exchange resin, and pouring the thus treated sol into an ammonium-containing alkaline solution to precipitate silica.

A Japanese Patent Laid Open No. Sho. 60-191016 also discloses a process for producing precipitated silica by adding a strong acid to an alkali silicate to obtain a free acid concentration of 1 N or more, and precipitating silica at a high temperature from 70° C. to 90° C.

Japanese Patents Laid Open No. Sho. 60-2041613 and Japanese Patents Laid Open No. Sho. 60-2041614 also disclose processes which comprise producing silica gel from a concentrated alkali silicate aqueous solution by simply rinsing it, and heating the gel in a strong acid repeatedly.

These prior processes, however, hardly provide a highly pure silica having metal impurity content of 1 ppm or less because they use low purity alkali silicates as starting materials. Consequently, a highly pure (low impurity) alkali silicate aqueous solution must be used as a starting material to produce a highly pure silica.

Non-alkali metal impurities exist as silicate complexes in an alkali silicate solution The complexes are very stable at ordinary temperature; they hardly dissolve in water except when a large amount of hydrochloric acid is added. When a hydrochloric acid is added, non-alkali metals form water soluble metal chlorides. The previously referred Japanese Patent Laid Open No. Sho. 60-191016 uses this reaction. According to this invention, a large amount of hydrochloric acid is added to an alkali silicate solution (silica content, 10% by weight or less) until the solution turns acidic, then the solution is contacted with the ion-exchange resin to remove metal impurities. The metal impurities are removed very efficiently.

SUMMARY OF THE INVENTION

In the referred to processes, silicic acid in a silicate solution under acidic condition forms an oligomer or gel in a short time. Once non-alkali metals are captured in silicon oxide oligomer or gel, they hardly dissolve into the aqueous solution. This is the reason why the prior patents failed to obtain non-alkali metal-content of 1 ppm or less.

The inventors of the present application have studied the removal of non-alkali metals which exist as complexes with silicic acid oligomers, and have discovered an effective method for removing the metals. The method comprises an electrochemical process which serves to change the metal complexes to water-soluble metallic salts. Once the metallic salts are formed, they are easily removed by ion-exchanging. It is therefore a primary object of the present invention to provide a silica source for highly pure silica material. It is another object of the invention to provide a method for removing metal impurities in an alkali silicate solution used as a cheap starting material.

DETAILED DESCRIPTION OF THE PREFERRED EMBODIMENTS

Figure 1:
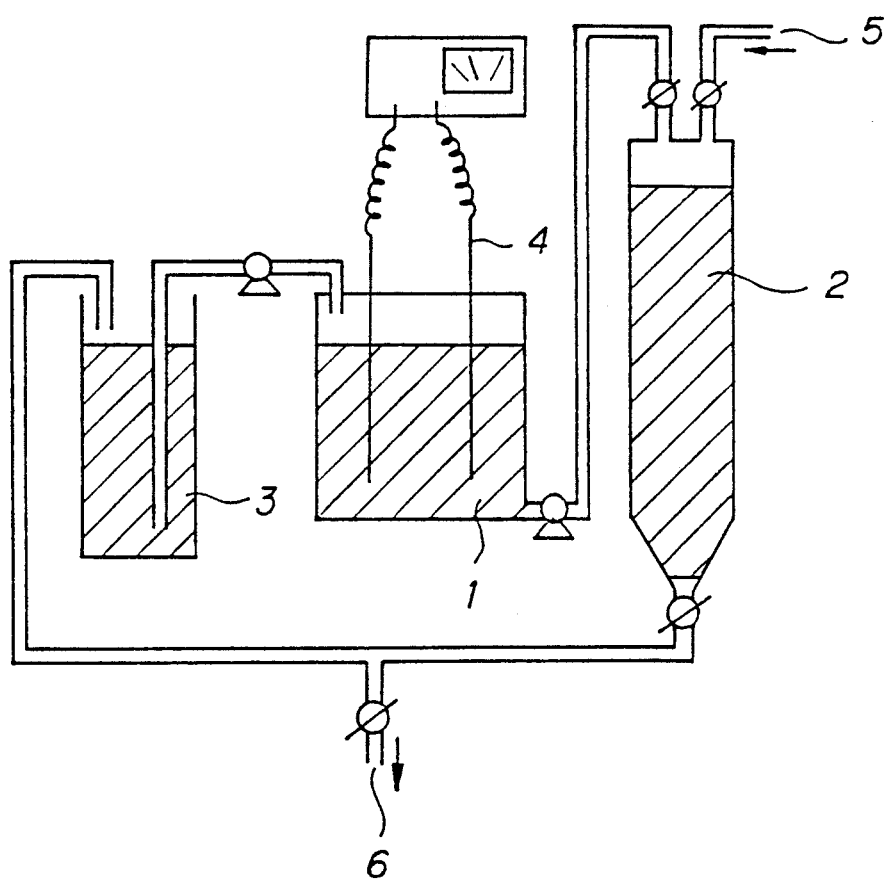
FIG. 1 is a schematic view illustrating an apparatus used for removing metals in an alkali silicate aqueous solution in accordance with the present invention.

The gist of the present invention is to remove alkali metals in an alkali silicate aqueous solution by ion-exchanging, to apply an electrochemical process to the solution in the presence of strong acids and oxidizing agents to from water-soluble salts of non-alkali metals, and to remove the non-alkali metals in solution by ion-exchanging.

The ion-exchange resins used in ion-exchanging are of a strong acid type, of weak acid type, or of mixed acid types.

The application of electrochemical process to the silicic acid solution serves to shorten reaction time for metal elements to form water soluble salts, thus metal atoms can be easily removed by ion-exchanging before the acidic silica sol forms gel.

According to the present invention, commercially available JIS(Japanese Industrial Standard)water glass is preferably used as a cheap starting material, however, any alkali silicate aqueous solution may be used as a starting material.

According to the present invention, diluted alkali silicate aqueous solutions having silica content of 1 to 10% by weight and a pH7 or more are preferably used.

According to the invention, as acidic silicic acid sol is first produced by the removal of alkali metals by ion-exchanging of the alkali silicate aqueous solution. Then the electrochemical process is applied to the sol. The term "electrochemical process" in the present invention means a process comprising inserting a pair of electrodes into the silicic acid solution, and applying electrical voltage to the electrodes. On the surfaces of electrodes, reduction and oxidation of the metals, existing as silicate compounds in the aqueous solution, occur, thus water-soluble salts are formed.

Preferable electrodes are platinum, gold, and gold-platinum alloy electrode, however, any other electrode may be used in the present invention. Especially preferable electrode is a platinum electrode having high surface area, produced by treating the platinum electrode in an aqueous solution of $PtCl_4$ salt such as $Na_2(PtCl_4)$ or $K_2(PtCl_4)$, until the surface of platinum electrode becomes rough. The gold electrode treated similarly may be preferably used.

Both direct and alternating currents are used, however, the alternating current is preferable because hydrogen generates when the direct current is used. Voltage of from 0.1 V to 100 V is preferable. The alternating current of from 1 Hz to 1 MHz frequency, preferably from 0.1 KHz to 10 KHz frequency is preferable. Further, the alternating current having rectangular wave form is preferable because it has a higher energy density.

Silica sol, to which the electrochemical process is applied, must be acidic, and strong acids having high electronegativity must exist in order to form water-soluble metalic salts. Accordingly, the strong acid should be added previous to the electrolysis reaction. Examples of strong acid are hydrochloric acid, nitric acid and hydrobromic acid. The acid content of 0.01 to 1% by weight is preferable. In other words, the acid is preferably added so as to get pH of 1 to 2 where longer gel time of silica sol is obtained.

According to the present invention, 0.01 to 1% by weight of oxidizing agents must be added to silicic acid sol to accelerate oxidation reaction of metals. Preferred oxidizing agent is hydrogen peroxide aqueous solution, hypochlorous acid or nitrous acid, or a combination thereof. If the oxidizing agent is not added, reduction and oxidation reaction of metals is delayed, and gelation of silicic acid proceeds faster than oxidation reaction.

Metal atoms forming water soluble salts after the electorochemical process can be easily removed from the silicic acid sol by ion-exchanging. However, if gelation of silicic acid occurs, ion exchanging becomes impossible. Consequently, it is preferable to ion exchange the sol while the electrochemical reaction proceeds More particularly, after the silicic acid sol is electrochemically treated, it is passed through an ion-exchange column, and again the sol is electrochemically treated and the thus treated sol is passed through the column. In order to reduce the impurity content, it is preferable to repeat the electrochemical process and the ion-exchange process.

A small ion-exchange column suffices for the above ion-exchange steps because the amount of metal atoms to be exchanged is very small.

As described above, the present invention provides a process for producing silicic acid having metal content of 2 ppm or less, preferably of 1 ppm or less comprising the steps of:

removing alkali metals in the alkali silicate aqueous solution by ion exchanging to obtain the acidic solution, adding the strong acid and the oxidizing agent to the solution.

applying the electrochemical process to the solution to form water soluble salts of non-alkali metals existing in the water as silicate compounds, ion-exchanging thus treated solution to remove metal atoms existing as water soluble salts.

EXAMPLES

The following examples and a comparative example will clearly illustrate the preferred embodiments of the present invention.

In the examples, Fe and Al contents per silica were measured by a Inductively Coupled Plasma Atomic Emission Spectroscopy.

EXAMPLE 1

A commercially available concentrated sodium silicate solution(Nippon Chemical Industries Co. Ltd. JIS No.3 sodium silicate) was diluted to silica content of 5% by weight. The solution thus diluted was passed through an activated cation-ion-exchange resin(Diaion SK1B) bed to remove sodium in sodium silicate.

To this solution, hydrochloric acid and hydrogen peroxide aqueous solution were added to obtain a solution having silica content of 4% by weight, hydrochloric acid content of 0.1% by weight, and hydrogen peroxide aqueous solution content of 0.1% by weight. The pH value of solution was 0.5, and the gelation time was about 72 hours at room temperature.

Then the solution of 2000 cc was taken into a polypropylene container, and was electrochemically treated in the apparatus shown in FIG. 1.

In FIG. 1, 1 is an electrolytic cell, 2 is an ion-exchange tower filled with 2000 ml of Diaion SK1B, and 3 is a storage container, and each of 1, 2, and 3 is connected with pipes and a pump. The ion-exchange tower 2 is provided with an inlet 5 for distilled water and hydrochloric acid. An outlet 6 for sample picking-up is provided between the ion-exchange tower 2 and the storage container 3.

A silicic acid aqueous solution was pumped to circulate the solution through the electrolytic cell 1, the ion-exchange tower 2, and the storage container 3. A pair of electrodes (golden plates, 20 cm$^2$) were placed at distance of 2 cm to let the solution flow between the electrodes. An alternating current having a rectangular wave from and frequency of 1 KHz, voltage of 2 V was applied between the electrodes. Sending speed was adjusted to obtain a linear speed in the tower of 2 cm/min. The circulation was continued for totally 24 hours. Table 1 shows circulation time and Fe and Al contents per silica in the silicic acid solution.

EXAMPLE 2

A purification process as described in Example 1 was repeated except that platinum electrodes were used instead of gold electrodes. The circulation was continued for 24 hours. Fe and Al contents per silica in the silicic acid aqueous solution, after the circulation, are shown in Table 1.

EXAMPLE 3

The purification process as described in Example 1 was repeated except that the alternative current frequency of 100 Hz was used. The circulation was continued for 24 hours. Fe and Al contents per silica in the silicic acid aqueous solution, after the circulation, are shown in Table 1.

COMPARATIVE EXAMPLE

The commercially available concentrated sodium silicate soluton(Nippon Chemical Industries Co., Ltd. JIS No.3 sodium silicate) was diluted to silica content of 5% by weight. The aqueous solution thus obtained was passed through the activated caton ion-exchange resin(Diaion SK1B) to remove sodium in sodium silicate. The silicic acid solution thus obtained was treated with the ion-exchange resin two times. Fe and Al contents per silica in the silicic acid sol, after ion exchanging, are shown in Table 1.

TABLE 1

| Example | Circulation time (hour) | Fe (ppm) | Al (ppm) |
|---|---|---|---|
| 1 | 0 | 124 | 406 |
|   | 1 | 20 | 40 |
|   | 4 | 2.5 | 4 |
|   | 12 | 1 or less | 1 |
|   | 24 | 1 or less | 1 or less |
| 2 | 0 | 124 | 406 |
|   | 1 | 30 | 60 |
|   | 4 | 10 | 15 |
|   | 12 | 1 or less | 2 |
|   | 24 | 1 or less | 1 or less |
| 3 | 0 | 124 | 406 |
|   | 1 | 24 | 48 |
|   | 4 | 8 | 13 |
|   | 12 | 1 or less | 2 |
|   | 24 | 1 or less | 1 or less |
|   | number of ion exchange times | | |
| Comparative Example | 0 | 124 | 406 |
|   | 1 | 54 | 198 |
|   | 2 | 48 | 198 |
|   | 3 | 48 | 198 |

The above results clearly show that the process comprising, ion exchanging the alkali silicate aqueous solution to obtain the acidic solution, adding the strong acid and the oxidizing agent to the acidic solution, applying the electrochemical process to the solution to form water soluble salts of non-alkali metals which dissolve in water as silicate compounds, and ion exchanging the solution to remove non-alkali metals, is a very excellent process for eliminating metals from sodium silicate.

Removing metal elements from an alkali silicate aqueous solution to a metal content of 1 ppm or less has been thought to be impossible. However, according to the present invention, metal elements in an alkali silicate aqueous solution can be removed very easily and effectively to a metal content of 1 ppm or less.

Highly pure silica can be produced from the low metal-content-silica sol, produced thus by adding a large amounts of ammonium salt and organic alkali to the sol to precipitate silica, and rinsing precipitates thus formed with pure water. Further, highly pure colloidal silica can be produced from silica sol of the present invention.

Highly pure silica produced according to the present invention is used as all kinds of fillers, fillers for simiconductors, and for quartz glass.

We claim:

1. A process for producing silicic acid aqueous solution which comprises, removing alkali metals from a 1 to 10% by weight alkali silicate aqueous solution by contacting an ion-exchange resin with said solution, applying an electrochemical process to the aqueous solution in the presence of 0.01 to 1% by weight of a strong acid, which is a member selected from the group consisting of hydrochloric acid, nitric acid and hydrobromic acid and mixtures thereof, and in the presence of 0.01 to 1% of an oxidizing agent, which is a member selected from the group consisting of hydrogen peroxide aqueous solution, hypochlorous acid and nitric acid and mixtures thereof, and removing non-alkali metals existing as water-soluble salts in the solution by contacting an ion-exchange resin with said solution to obtain the silicic acid aqueous solution.

2. The process of claim 1 wherein the silicic acid aqueous solution obtained has a 2 ppm or less metal content.

3. The process of claim 1 wherein the silicic acid aqueous solution obtained has a 1 ppm or less metal content.

4. A process as claimed in claim 1, wherein said electrochemical process comprises applying to the solution a voltage of from 0.1 V to 100 V of direct current or alternating current having frequency of from 10 Hz to 1 MHz.

5. A process as claimed in claim 1, wherein the ion-exchange resin used in ion-exchanging is of strong acid type, of weak acid type, or of mixed-acids type.

* * * * *